(12) United States Patent
Yoshida

(10) Patent No.: US 9,444,698 B2
(45) Date of Patent: Sep. 13, 2016

(54) COMPUTER-READABLE RECORDING MEDIUM STORING PROCESS FOR MONITORING COMPUTER, ITS METHOD AND APPARATUS

(71) Applicant: FUJITSU LIMITED, Kawasaki-shi, Kanagawa (JP)

(72) Inventor: Taketoshi Yoshida, Kunitachi (JP)

(73) Assignee: FUJITSU LIMITED, Kawasaki (JP)

(*) Notice: Subject to any disclaimer, the term of this patent is extended or adjusted under 35 U.S.C. 154(b) by 564 days.

(21) Appl. No.: 13/730,290

(22) Filed: Dec. 28, 2012

(65) Prior Publication Data
US 2013/0117447 A1 May 9, 2013

Related U.S. Application Data

(63) Continuation of application No. PCT/JP2010/061707, filed on Jul. 9, 2010.

(51) Int. Cl.
G06F 15/173 (2006.01)
H04L 12/26 (2006.01)
G06F 11/30 (2006.01)

(52) U.S. Cl.
CPC .......... H04L 43/00 (2013.01); G06F 11/3006 (2013.01); G06F 11/3055 (2013.01); H04L 43/065 (2013.01); H04L 43/0817 (2013.01)

(58) Field of Classification Search
CPC .................................................. G06F 11/3006
USPC .................................................. 709/224, 225
See application file for complete search history.

(56) References Cited

U.S. PATENT DOCUMENTS 6,078,955 A * 6/2000 Konno et al. .............. 709/224
6,484,022 B1 * 11/2002 Findikli et al. ............. 455/411

(Continued)

FOREIGN PATENT DOCUMENTS

EP   1 434 387 A1   6/2004
EP   1 662 395 A2   5/2006

(Continued)

OTHER PUBLICATIONS

PCT International Preliminary Report on Patentability and Written Opinion of the International Searching Authority issued Feb. 12, 2013 in corresponding International Application No. PCT/JP2010/061707.

(Continued)

*Primary Examiner* — David Lazaro
*Assistant Examiner* — Marie Georges Henry
(74) *Attorney, Agent, or Firm* — Staas & Halsey LLP

(57) ABSTRACT

For each group including a plurality of computers, a monitoring computer includes a storage storing a monitoring path which associates a monitoring-source computer that is an origin of monitoring with at least one computer that is both a monitored target and a monitoring source. When an instruction including specification information specifying a group is given, the monitoring computer references the monitoring path in the storage and distributes a monitoring path related to the group specified by the specification information to each computer belonging to the group specified by the specification information. The monitoring computer makes a request for the monitoring-source computer that is the origin of monitoring in the monitoring path to monitor another computer in conformity with the monitoring path.

6 Claims, 16 Drawing Sheets

(56) References Cited

U.S. PATENT DOCUMENTS

| | | | |
|---|---|---|---|
| 7,890,645 B2 * | 2/2011 | Nagai | H04L 41/0853 709/223 |
| 8,667,034 B1 * | 3/2014 | Simon | G06F 17/30197 707/827 |
| 2002/0152052 A1 | 10/2002 | Tsuru | |
| 2004/0172469 A1 | 9/2004 | Takahashi et al. | |
| 2006/0114819 A1 | 6/2006 | Shimizu | |
| 2009/0125589 A1 * | 5/2009 | Anand | H04L 65/1083 709/204 |

FOREIGN PATENT DOCUMENTS

| | | | | |
|---|---|---|---|---|
| JP | 8223161 A | * | 8/1966 | G06F 11/30 |
| JP | 8-223161 | | 8/1996 | |
| JP | 2000-148539 | | 5/2000 | |
| JP | 2002-312199 | | 10/2002 | |
| JP | 2003-30161 | | 1/2003 | |
| JP | 200330161 A | * | 1/2003 | |
| JP | 2004-220562 | | 8/2004 | |
| JP | 2006-154991 | | 6/2006 | |
| JP | 2009-217307 | | 9/2009 | |
| JP | 2010-92395 | | 4/2010 | |

OTHER PUBLICATIONS

International Search Report for PCT/JP2010/061707; mailed Aug. 10, 2010.

* cited by examiner

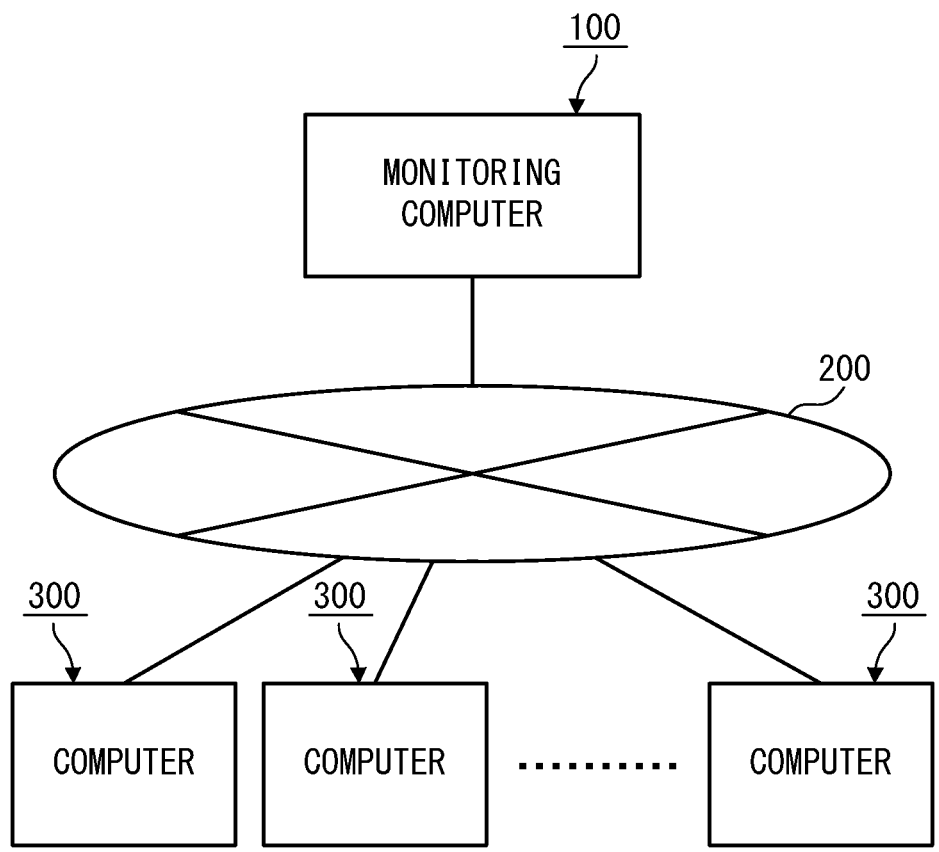
F I G. 1

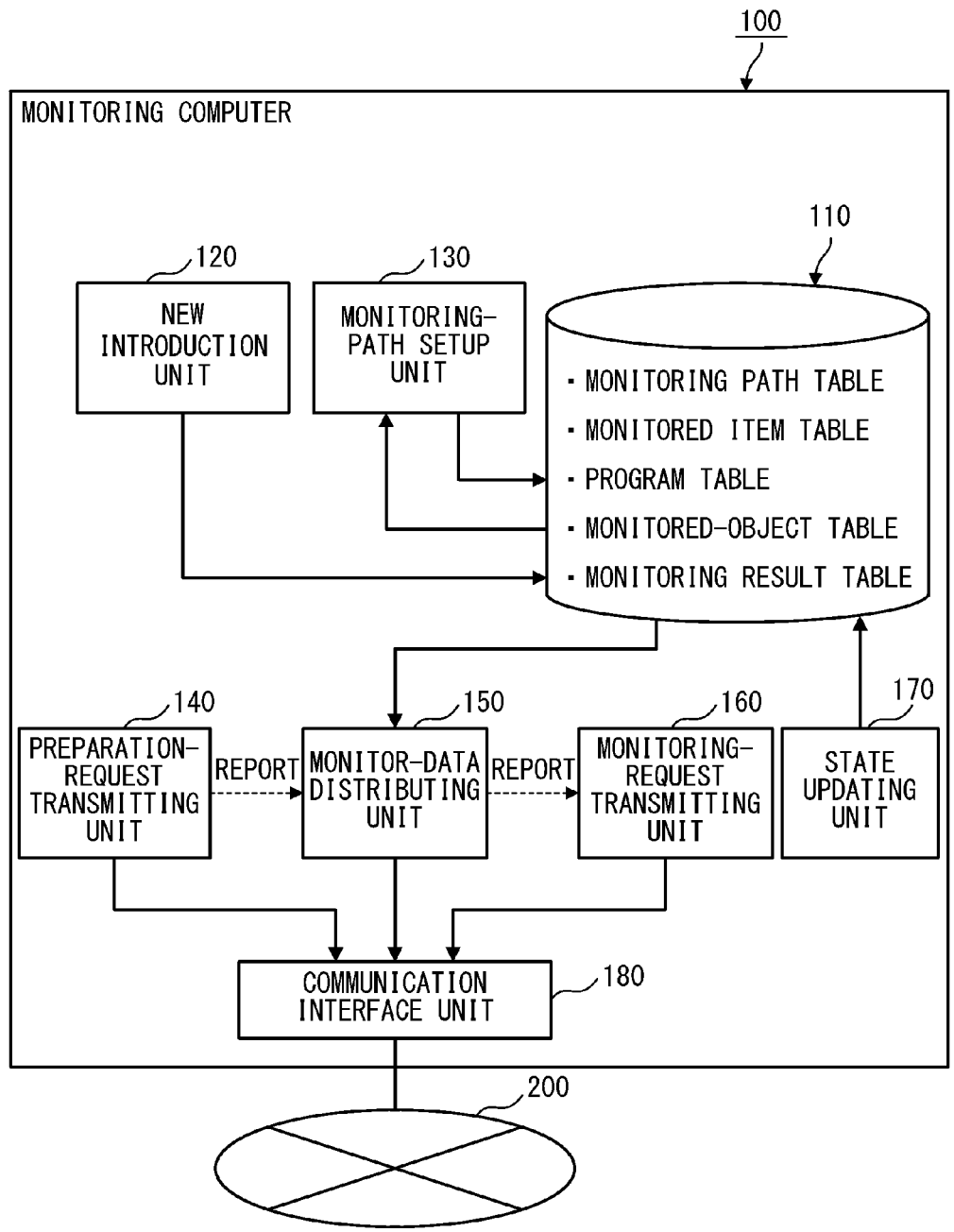
F I G. 2

FIG. 3

| GROUP ID | MONITORING SOURCE | MONITORED TARGET/ MONITORING SOURCE | MONITORED TARGET/ MONITORING SOURCE | ...... |
|---|---|---|---|---|
| GROUP 1 | COMPUTER 10 | COMPUTER 11 | COMPUTER 12 | ...... |
| GROUP 2 | COMPUTER 20 | COMPUTER 21 | COMPUTER 22 | ...... |
| ...... | ...... | ...... | ...... | ...... |

| MONITORED OBJECT ID | MONITORED ITEM ID |
|---|---|
| COMPUTER 10 | ITEM 1, ITEM 2 |
| COMPUTER 11 | ITEM 1, ITEM 2, ITEM 3 |
| ...... | ...... |

| MONITORED ITEM ID | PROGRAM NAME |
|---|---|
| ITEM 1 | c:¥prg¥programA.exe |
| ITEM 2 | c:¥prg¥programB.exe |
| ...... | ...... |

| GROUP ID | MONITORED OBJECT ID |
|---|---|
| GROUP 1 | COMPUTER 10, COMPUTER 11, COMPUTER 12 |
| GROUP 2 | COMPUTER 20, COMPUTER 21, COMPUTER 22 |
| ...... | ...... |

110D

110E

| MONITORED OBJECT ID | MONITORED ITEM ID | OPERATING STATE |
|---|---|---|
| COMPUTER 10 | ITEM 1 | OK/NG |
| | ITEM 2 | OK/NG |
| COMPUTER 11 | ITEM 1 | OK/NG |
| | ITEM 2 | OK/NG |
| | ITEM 3 | OK/NG |
| ...... | ...... | ...... |

FIG. 7

F I G. 1 5
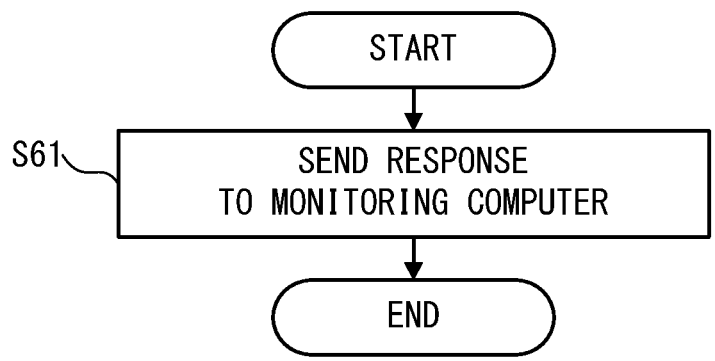
F I G. 1 6
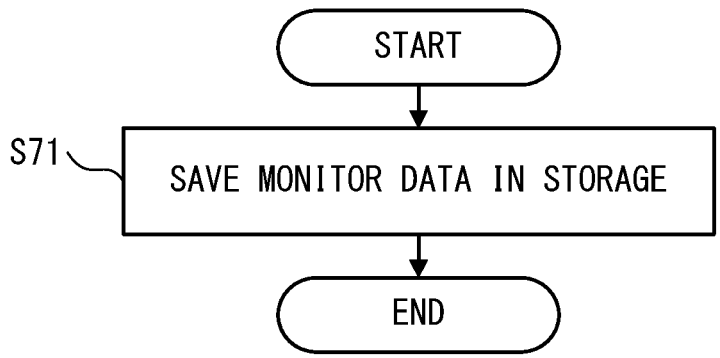

110A

| GROUP ID | MONITORING SOURCE | MONITORED TARGET/ MONITORING SOURCE |
|---|---|---|
| GROUP A | COMPUTER a | COMPUTER bN |
| GROUP B | COMPUTER c | COMPUTER dN |

110B

| MONITORED OBJECT ID | MONITORED ITEM ID |
|---|---|
| COMPUTER a | NULL |
| COMPUTER b | ITEM 1 |
| COMPUTER c | NULL |
| COMPUTER d | ITEM 1 |

|  | 110C |
|---|---|
| MONITORED ITEM ID | MONITORING PROGRAM |
| ITEM 1 | c:¥prg¥programA.exe |

|  | 110E | |
|---|---|---|
| MONITORED OBJECT ID | MONITORED ITEM ID | OPERATING STATE |
| COMPUTER b | ITEM 1 | OK |
| COMPUTER d | ITEM 1 | OK |

F I G. 2 4

110A

| GROUP ID | MONITORING SOURCE | MONITORED TARGET/ MONITORING SOURCE | MONITORED TARGET/ MONITORING SOURCE |
|---|---|---|---|
| GROUP A | COMPUTER a | COMPUTER bN | COMPUTER aN |

F I G. 2 5

110B

| MONITORED OBJECT ID | MONITORED ITEM ID |
|---|---|
| COMPUTER a | ITEM 1 |
| COMPUTER b | ITEM 1 |

F I G. 2 6

110E

| MONITORED OBJECT ID | MONITORED ITEM ID | OPERATING STATE |
|---|---|---|
| COMPUTER a | ITEM 1 | OK |
| COMPUTER b | ITEM 1 | OK |

| GROUP ID | MONITORING SOURCE | MONITORED TARGET/ MONITORING SOURCE |
|---|---|---|
| GROUP A | COMPUTER aN | COMPUTER d |
| GROUP A | COMPUTER bN | COMPUTER d |
| GROUP A | COMPUTER cN | COMPUTER d |

110A

F I G. 2 9
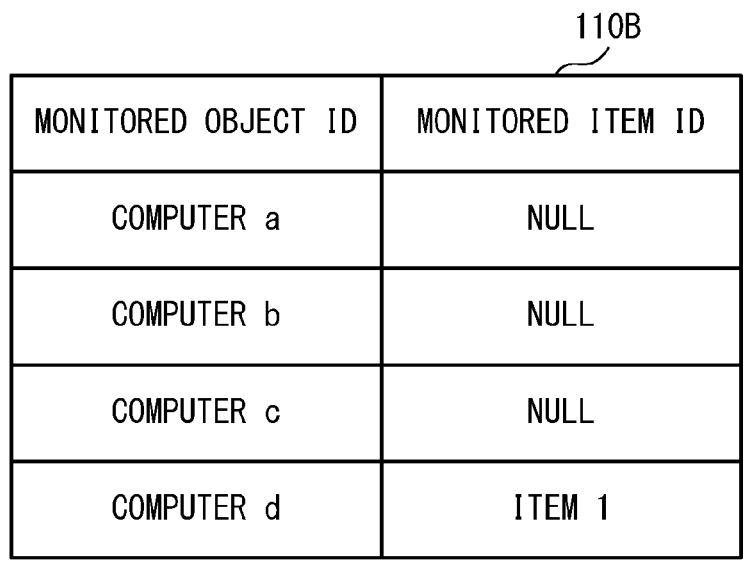
F I G. 3 0
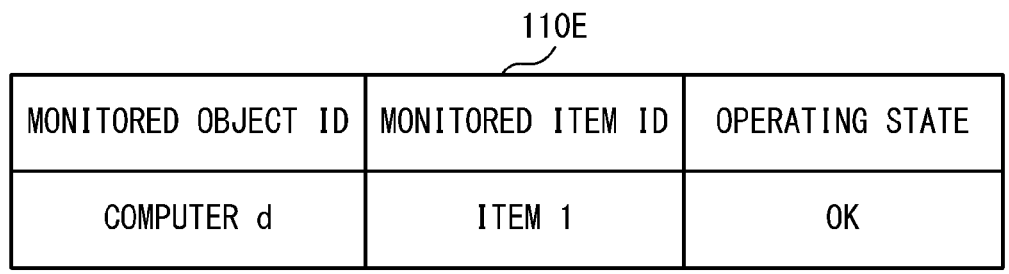

COMPUTER-READABLE RECORDING MEDIUM STORING PROCESS FOR MONITORING COMPUTER, ITS METHOD AND APPARATUS

CROSS-REFERENCE TO RELATED APPLICATION

This application is a continuation of International Application PCT/JP2010/061707 filed on Jul. 9, 2010 and designated the U.S., the entire contents of which are incorporated herein by reference.

FIELD

The present invention relates to a technology for monitoring a plurality of computers.

BACKGROUND

In data centers that provide service using a plurality of computers, an operating state of each computer is always monitored to, for example, ensure service qualities. Accordingly, a technology has been proposed in which each computer monitors the operating state of another computer in sequence in accordance with a monitoring path that connects the computers in a ring formation.

PRIOR ART DOCUMENT

Patent Document

Patent document 1: Japanese Laid-open Patent Publication No. 2002-312199

SUMMARY

For each group including a plurality of computers, a monitoring computer includes a storage storing a monitoring path that associates a monitoring-source computer, which is an origin of monitoring, with at least one computer which becomes both a monitored target and a monitoring source. When an instruction that includes specification information specifying a group is given, the monitoring computer references the monitoring path in the storage and distributes a monitoring path related to the group to each computer belonging to the group specified by the specification information. Moreover, the monitoring computer makes a request for a computer that is the origin of monitoring in the monitoring path to monitor another computer in accordance with the monitoring path.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a configuration diagram illustrating an example of an information system in accordance with an embodiment.

FIG. 2 is a function block diagram illustrating an example of each function of a monitoring computer.

FIG. 3 is a data structure diagram illustrating an example of a monitoring path table.

FIG. 4 is a data structure diagram illustrating an example of a monitored item table.

FIG. 5 is a data structure diagram illustrating an example of a program table.

FIG. 6 is a data structure diagram illustrating an example of a monitored-object table.

FIG. 7 is a data structure diagram illustrating an example of a monitoring result table.

FIG. 15 is a flowchart illustrating an example of a responding process.

FIG. 16 is a flowchart illustrating an example of monitor-data saving process.

FIG. 24 is an explanatory diagram of a monitoring path table in accordance with the second example.

FIG. 25 is an explanatory diagram of a monitored item table in accordance with the second example.

FIG. 26 is an explanatory diagram of a monitoring result table in accordance with the second example.

FIG. 29 is an explanatory diagram of a monitored item table in accordance with the third example.

FIG. 30 is an explanatory diagram of a monitoring result table in accordance with the third example.

DESCRIPTION OF EMBODIMENTS

Figure 8:
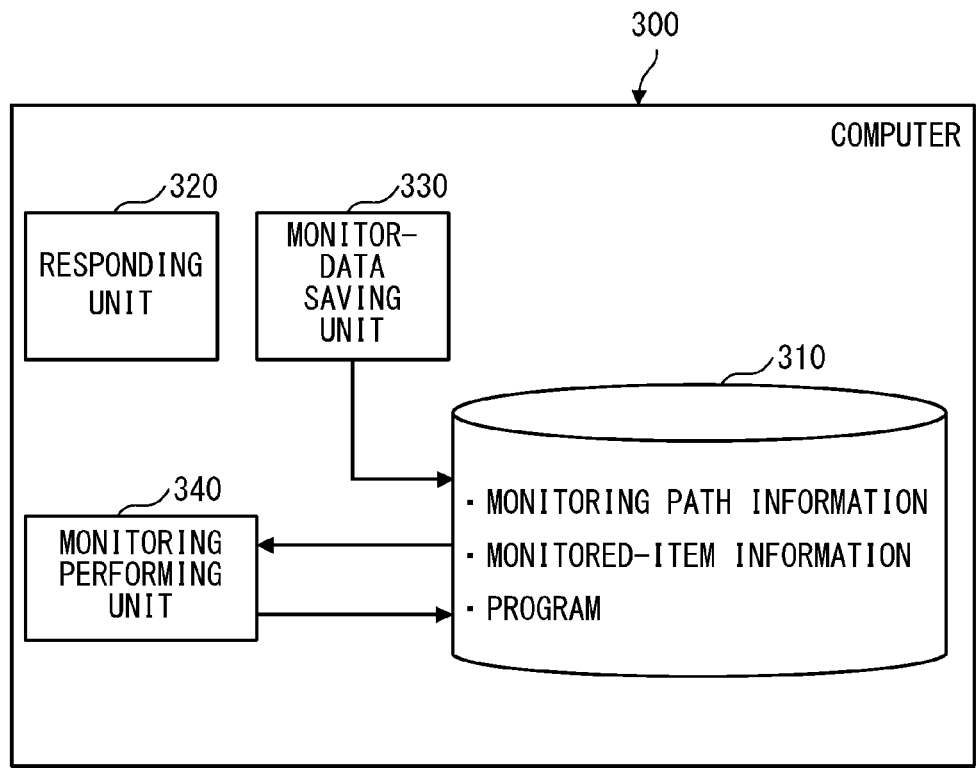
FIG. 8 is a function block diagram illustrating an example of each function of a computer.

In prior arts, however, increasing the number of computers to be monitored leads to a certain time required to cover a ring-shaped monitoring path, with the result that time intervals between operations of monitoring the computers become long. When time intervals between the operations of monitoring the computers become long, a failure that occurs in a certain computer is not quickly detected, and there is, for example, a risk of decreasing a service quality provided by the data center.

Accordingly, in one aspect, in view of problems of conventionally proposed technologies, the present invention is aimed at providing a monitoring technology for efficiently monitoring a plurality of computers.

In the following, embodiments to implement the present invention will be described in detail with reference to the attached drawings.

FIG. 1 illustrates an example of an information system in accordance with the present embodiment.

A monitoring computer 100, which monitors an operating state of a computer, is connected to a plurality of monitored-object computers 300 (hereinafter referred to as "computers") via a network 200 such as the internet. As an example, the computers 300 may each be connected to the network 200 via a router and a switch.

As illustrated in FIG. 2 to FIG. 7, the monitoring computer 100 includes a storage 110 to store a monitoring path table 110A, a monitored item table 110B, a program table 110C, a monitored-object table 110D, and a monitoring result table 110E. An external storage apparatus, e.g., an HD (hard disk) or an SSD (solid state drive), may be used as the storage 110 (this is also true for the following descriptions).

The monitoring path table 110A indicates, for each group, a relationship (a monitoring path) that indicates which computers need to be monitored sequentially under the condition in which a certain computer is an origin. Groups may be properly set up by, for example, an administrator who administrates the information system, and, as an example, the administrator sets up groups to each of which a plurality of computers belong.

As an example, as illustrated in FIG. 3, for a group (ID#1), the monitoring path table 110A stores an ID of a computer 10 as a monitoring-source computer that is an origin of monitoring, stores, to the right of the ID of the computer 10, an ID of a computer 11 as a monitored object to be monitored by the computer 10, and stores an ID of a computer 12 as a monitored object to be monitored by the computer 11. The IDs of the computers are stored in such a manner that the monitoring path is traced sequentially from the left side, but, as long as a monitoring object is associated with a monitored object, another storing method may be used.

Also, for other groups such as groups 2 and 3, information indicating a monitoring path is stored in the table.

For each computer, the monitored item table 110B defines items (monitored items) for which operating states of various resources for the computer need to be monitored, e.g., the temperature of a CPU (central processing unit) and the temperature of an HD.

As illustrated in FIG. 4, the monitored item table 110B includes records that associate the IDs of computers with information indicating contents of monitored items. For the contents of monitored items, another table (e.g., FIG. 5) may be referenced, and, in such a case, the monitored item table 110B may store IDs of one or more monitored items. The monitored item table 110B illustrated in FIG. 4 defines that items 1 and 2 be monitored for the computer 10 and that items 1, 2 and 3 be monitored for the computer 11.

As an example of a table that indicates contents of monitored items, the program table 110C indicates monitored contents using program names. By executing corresponding programs, the operating states of various resources to be monitored may be specified and these operating states may be monitored. As an example, as illustrated in FIG. 5, the program table 110C includes a record that associates a monitored item ID for specifying a monitored item with a program name for monitoring the item specified by the monitored item ID. An absolute path indicating the location of the program may be assigned to the program name. The program table 110C illustrated in FIG. 5 defines that a program that monitors the item 1 be "c:¥prg¥programA.exe" and a program that monitors the item 2 be "c:¥prg¥programB.exe". The programs may be stored in the storage 110 in FIG. 2.

For each group, the monitored-object table 110D defines a plurality of computers 300 which are monitored objects and which include a computer 300 that cannot be actually monitored, e.g., a computer 300 that has failed or been under maintenance. As illustrated in FIG. 6, the monitored-object table 110D includes a record that associates a group ID for identifying a group with monitored object IDs for specifying the computers 300. The monitored-object table 110D illustrated in FIG. 6 defines, as monitored objects, computers 10, 11 and 12 of the group 1 and computers 20, 21 and 22 of the group 2.

The monitoring result table 110E stores a monitoring result for each item. As illustrated in FIG. 7, the monitoring result table 110E includes a record that associates an ID of a computer, at least one monitored item ID for the computer, and a monitoring result. In this example, an operating state (OK or NG) of each monitored item, which is a result of monitoring an operating state for each monitored item, is stored in the table. The monitoring result table 110E illustrated in FIG. 7, which displays monitoring results of the group 1, stores operating states related to the monitored items 1 and 2 of the computer 10 and operating states related to the monitored items 1, 2 and 3 of the computer 11. Of course, also for other groups, monitoring results are stored in corresponding tables.

The monitoring path table 110A, the monitored item table 110B, the program table 110C, and the monitored-object table 110D are properly set up by, for example, an administrator of the information system using a tool. The monitoring path table 110A and the monitored-object table 110D may be set up automatically via the process described hereinafter.

As illustrated in FIG. 2, by executing a monitoring program, the monitoring computer 100 implements functions corresponding to a new introduction unit 120, a monitoring-path setup unit 130, a preparation-request transmitting unit 140, a monitor-data distributing unit 150, a monitoring-request transmitting unit 160, and a state updating unit 170. The monitoring program is read from a computer-readable recording medium such as a CD-ROM (compact disk read only memory) or a DVD-ROM (digital versatile disk read only memory) and is installed in an external storage apparatus such as an HD or an SSD using a publicly known means. A processor such as a CPU in the monitoring computer 100 read the monitoring program from the external storage apparatus and performs the monitoring program.

In accordance with an introduction instruction with a group ID and a monitored object ID of a computer 300 to be newly introduced, the new introduction unit 120 additionally registers the monitored-object computer 300 in the monitored-object table 110D of the storage 110. In accordance with a setup instruction with the group ID to set up a monitoring path, the monitoring-path setup unit 130 references the monitored-object table 110D of the storage 110 and, according to a load on the computers 300, automatically sets up and registers a monitoring path of the group specified by the group ID. In accordance with a start instruction with the group ID to start monitoring the computers 300, the preparation-request transmitting unit 140 transmits a preparation request to all of the computers 300 belonging to the group specified by the group ID. In accordance with a response from the computers 300 to the preparation request, the monitor-data distributing unit 150 reads monitor data for monitoring operating states of various resources (monitoring path information, monitored-item information, and a program) from stored data of the storage 110 and transmits (distributes) this monitor data to all of the computers 300 belonging to the monitored object group. In accordance with a report from the monitor-data distributing unit 150, the monitoring-request transmitting unit 160 transmits a monitoring request to a computer 300 that is an origin of monitoring. In accordance with an arrival of a monitoring result from a computer 300 that is set to report the monitoring result (e.g., a computer within the group that is set up at the end of the monitoring path), the state updating unit 170 updates the monitoring result table 110E of the storage 110.

In addition, the monitoring computer 100 includes, for example, a communication interface unit 180 such as an NIC (network interface card). The preparation-request transmitting unit 140, the monitor-data distributing unit 150, and the monitoring-request transmitting unit 160 are connected to the network 200 via the communication interface unit 180.

Meanwhile, as illustrated in FIG. 8, the computer 300 includes a storage 310 to store monitoring path information, monitored-item information, and a program. The monitoring path information and the monitored-item information indicate a monitoring path of a group to which the computer 300 belongs and a monitored item of another computer 300 monitored by the computer 300. As illustrated in FIG. 8, the computers 300 each implement a responding unit 320, a monitor-data saving unit 330, and a monitoring performing unit 340. The responding unit 320, the monitor-data saving unit 330, and the monitoring performing unit 340 are implemented when a computer 300 is newly introduced by, for example, an administrator of the information system, e.g., these units are implemented by incorporating an agent in the computer 300 in advance.

The responding unit 320, the monitor-data saving unit 330 and the monitoring performing unit 340 may be achieved by a program distributed to the computers 300 before the preparation-request transmitting unit 140 of the monitoring computer 100 transmits a preparation request.

In accordance with an arrival of the preparation request from the monitoring computer 100, the responding unit 320 sends to the monitoring computer 100 a response that indicates that monitoring has been prepared. In accordance with an arrival of monitor data associated with the sending of the response to the monitoring computer 100, the monitor-data saving unit 330 saves in the storage 310 monitoring path information, monitored-item information, and a program, all of which are the monitor data. In accordance with an arrival of the monitoring request, the monitoring performing unit 340 monitors another computer 300 in conformity with the monitoring path information.

Next, descriptions will be given of processes performed by units of the monitoring computer 100 and the computer 300.

Figure 9:
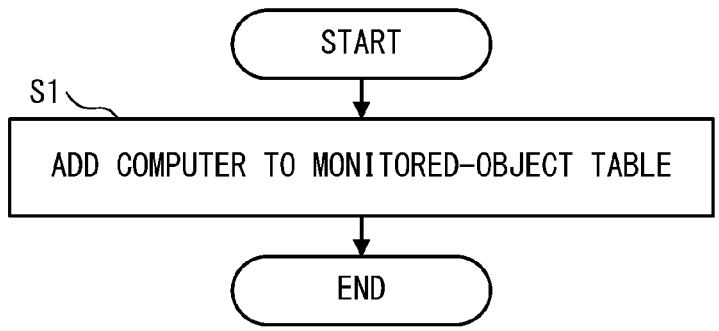
FIG. 9 is a flowchart illustrating an example of a new introduction process.

FIG. 9 illustrates an example of a new introduction process performed by the new introduction unit 120 of the monitoring computer 100 in accordance with an introduction instruction with a group ID and a monitored object ID.

In step 1 (referred to as "S1" in the drawings and in the following descriptions), the new introduction unit 120 references the monitored-object table 110D of the storage 110 and additionally registers a monitored object ID at an end of a record specified by a group ID.

In the new introduction process, the monitored-object table 110D of the storage 110 is sequentially updated in accordance with an introduction instruction by, for example, an administrator of the information system. Accordingly, referencing the monitored-object table 110D may clarify which computer 300 needs to be monitored and may clarify computers 300 that belong to each group.

Figure 10:
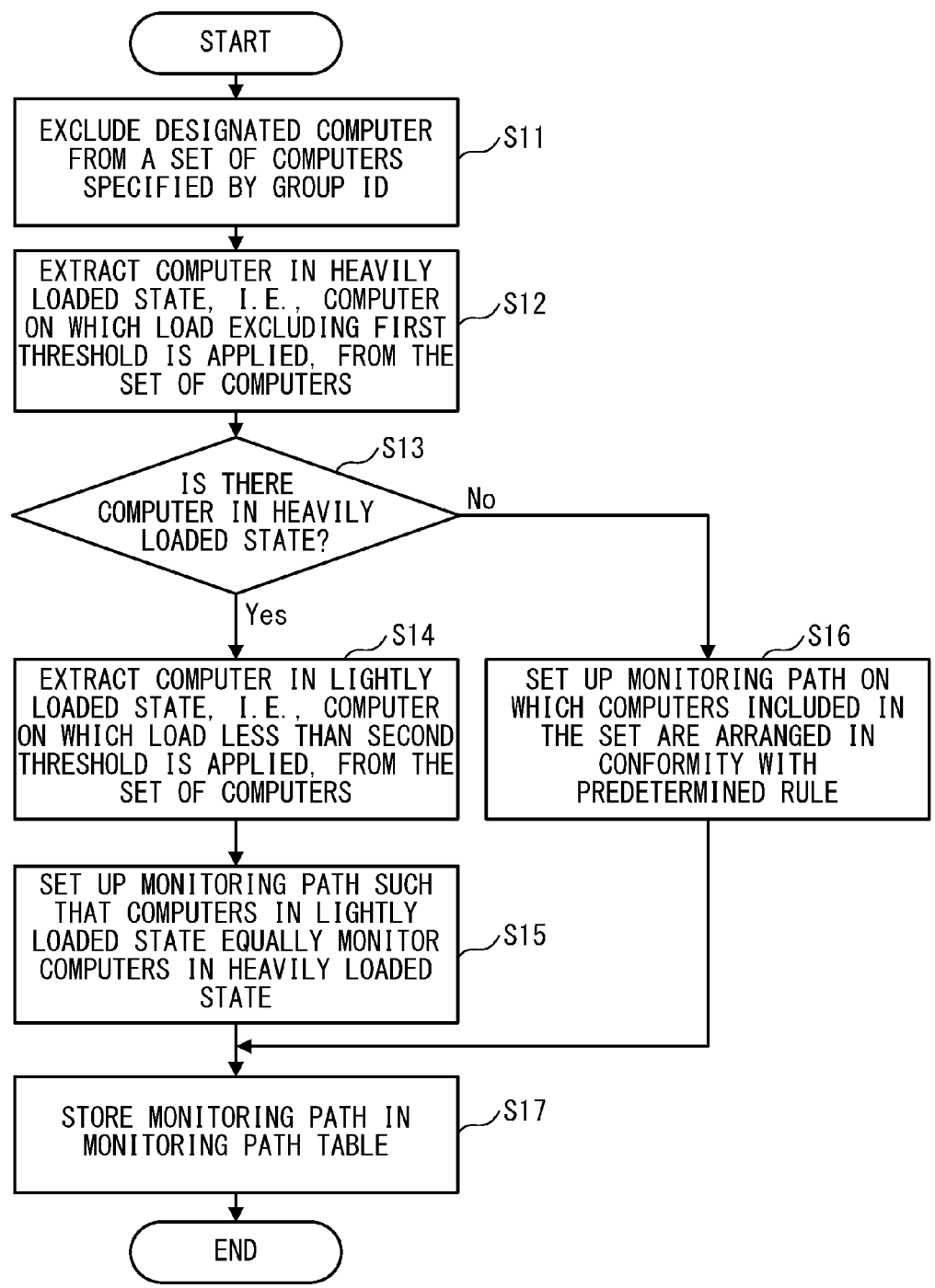
FIG. 10 is a flowchart illustrating an example of a monitoring-path setup process.

FIG. 10 illustrates an example of a monitoring-path setup process performed by the monitoring-path setup unit 130 of the monitoring computer 100 in accordance with a setup instruction with a group ID. The setup instruction includes information that designates a computer 300 to be excluded from monitored objects such as a computer 300 that has failed or has been under maintenance.

In step 11, the monitoring-path setup unit 130 references the monitored-object table 110D of the storage 110, and, from a set of computers 300 registered in a record specified by the group ID, the monitoring-path setup unit 130 excludes a computer 300 to be excluded from monitored objects. When a computer 300 to be excluded from monitored objects is not designated, the monitoring-path setup unit 130 may generate a set of computers 300 registered in a record specified by the group ID. To exclude a computer 300 that, for example, has failed or has been under maintenance from monitored objects, it is desirable that the ID of the computer to be excluded be stored in the storage 110 as an exclusion list and be updated on an as-needed basis.

In step S12, the monitoring-path setup unit 130 extracts a computer 300 in a heavily loaded state, i.e., a computer 300 to which a load exceeding a first threshold is applied, from the set of computers 300 registered in the record specified by the group ID. Loads on computers 300 may be determined by, for example, a function provided by an agent that measures a load and that is distributed to the computers 300 in advance (this is also true for the following descriptions).

In step S13, the monitoring-path setup unit 130 determines whether or not there is a computer 300 that is in the heavily loaded state. When the monitoring-path setup unit 130 determines that there is a computer 300 that is in the heavily loaded state, the monitoring-path setup unit 130 moves the process along to step 14 (Yes), and meanwhile, when the monitoring-path setup unit 130 determines that there is no computer 300 that is in the heavily loaded state, the monitoring-path setup unit 130 moves the process along to step 16 (No).

In step 14, the monitoring-path setup unit 130 extracts a computer 300 in a lightly loaded state, i.e., a computer 300 to which a load less than a second threshold is applied, from the set of computers 300. The second threshold may be lower than the first threshold in order to specify a computer 300 in the lightly loaded state.

In step 15, the monitoring-path setup unit 130 sets up a monitoring path such that computers 300 in the lightly loaded state equally monitor a computer 300 in the heavily loaded state. That is, the computer 300 in the heavily loaded state can barely afford to monitor another computer 300, so the computer 300 in the heavily loaded state is protected from performing a monitoring process, thereby preventing a bottleneck which would be caused by a lack of processing capacity from occurring.

In step 16, the monitoring-path setup unit 130 sets up a monitoring path on which computers 300 included in the set are arranged in conformity with a predetermined rule. As an example, a rule that computers 300 be sequentially arranged in ascending or descending order of IP (internet protocol) addresses or monitored object IDs may be applied as the predetermined rule.

In step 17, the monitoring-path setup unit 130 stores the monitoring path set up in step 15 or 16 in the monitoring path table 110A of the storage 110.

In the monitoring-path setup process, a monitoring path for which loads are considered is automatically set up for computers 300 registered in the monitored-object table 110D of the storage 110 in accordance with a setup instruction by, for example, an administrator of the information system. In this case, when there is a computer 300 in the heavily loaded state, i.e., a computer 300 to which a load exceeding the first threshold is applied, a monitoring path is set up such that computers 300 in the lightly loaded state, i.e., computers 300 to which a load less than the second threshold is applied, equally monitor the computer 300 in the heavily loaded state. Accordingly, the computer 300 in the heavily loaded state does not monitor another computer 300, and hence a bottleneck which would be caused by a lack of processing capacity may be prevented from occurring. Meanwhile, when there is no computer 300 in the heavily loaded state, a monitoring path on which computers 300 are arranged in conformity with a predetermined rule may be automatically set up, thereby decreasing the labor required for, for example, an administrator to set up a monitoring path. In addition, a monitoring path may be set up by excluding a computer 300 that, for example, has failed or has been under maintenance from the computers 300 registered in the monitored-object table 110D, and hence a monitoring path that includes a computer 300 that cannot actually be monitored will not be set up.

Figure 11:
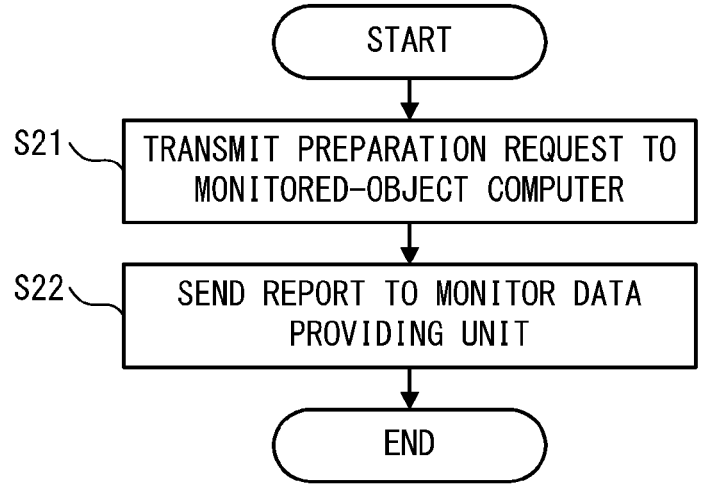
FIG. 11 is a flowchart illustrating an example of a preparation-request transmitting process.

FIG. 11 illustrates an example of a preparation-request transmitting process performed by the preparation-request transmitting unit 140 of the monitoring computer 100 in accordance with a start instruction with a group ID.

In step 21, the preparation-request transmitting unit 140 references the monitoring path table 110A of the storage 110 and transmits a preparation request to each computer 300 registered in a record specified by the group ID.

In step S22, the preparation-request transmitting unit 140 reports to the monitor-data distributing unit 150 that monitor data needs to start to be distributed. The report to the monitor-data distributing unit 150 includes a group ID to specify a monitored object group.

Figure 12:
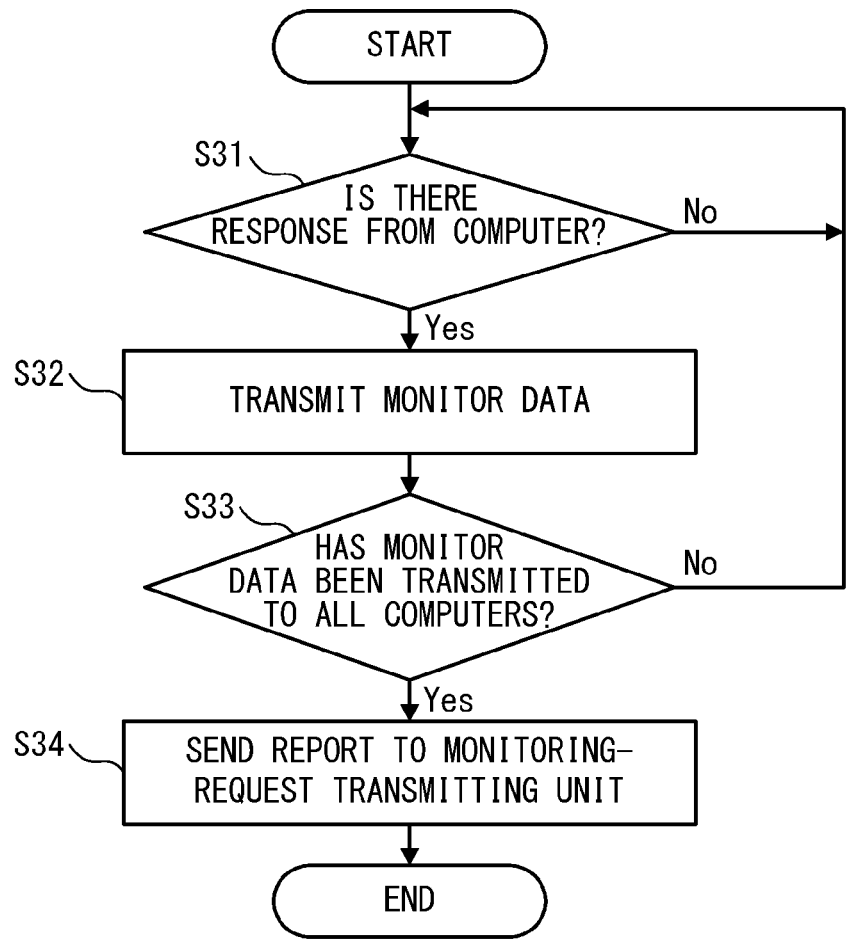
FIG. 12 is a flowchart illustrating an example of a monitor-data distributing process.

FIG. 12 illustrates an example of a monitor-data distributing process performed by the monitor-data distributing unit 150 of the monitoring computer 100 in accordance with the report from the preparation-request transmitting unit 140.

In step 31, the monitor-data distributing unit 150 determines whether or not there is a response from a monitored-object computer 300. When the monitor-data distributing unit 150 determines that there is response, the monitor-data distributing unit 150 moves the process along to step 32 (Yes), and, when the monitor-data distributing unit 150 determines that there is no response, the monitor-data distributing unit 150 repeats this process (No).

In step 32, the monitor-data distributing unit 150 distributes monitor data to a computer 300 that has made a response. That is, the monitor-data distributing unit 150 references the monitoring path table 110A of the storage 110 and generates monitoring path information obtained by extracting data related to a monitoring path from the record specified by the group ID. Meanwhile, the monitor-data distributing unit 150 references the monitored item table 110B of the storage 110 and generates monitored-item information obtained by extracting a record specified by a monitored object ID registered by the monitoring path information. In addition, the monitor-data distributing unit 150 references the program table 110C of the storage 110 and obtains a program name specified by a monitored item ID registered by the monitored-item information. The monitor-data distributing unit 150 transmits the monitoring path information, the monitored-item information, and a program specified by the program name to the computer 300 that has made response.

In step 33, the monitor-data distributing unit 150 references the monitoring path information and determines whether or not monitor data has been transmitted to all of the computers 300 specified by the monitored object IDs. When the monitor-data distributing unit 150 determines that monitor data has been transmitted to all of the computers 300, the monitor-data distributing unit 150 moves the process along to step 34 (Yes), and, when the monitor-data distributing unit 150 determines that monitor data has not been transmitted to all of the computers 300, the monitor-data distributing unit 150 returns the process to step 31 (No).

In step 34, the monitor-data distributing unit 150 reports to the monitoring-request transmitting unit 160 that a monitoring request needs to be transmitted. The report to the monitoring-request transmitting unit 160 includes a group ID to specify a monitored object group.

Figure 13:
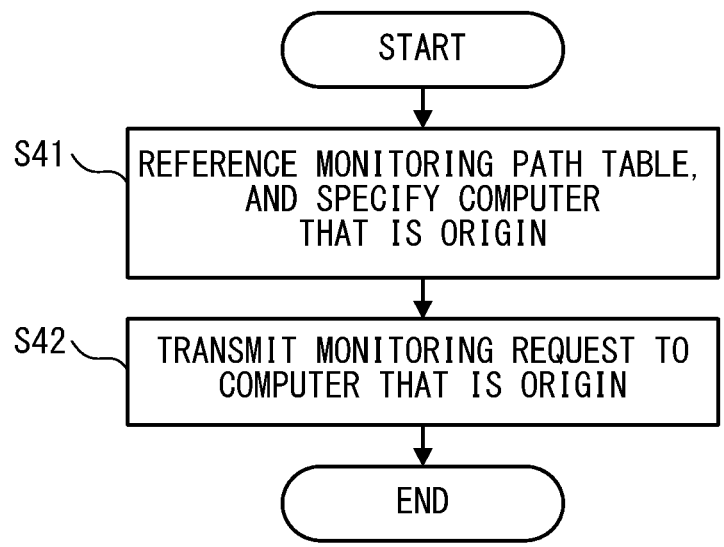
FIG. 13 is a flowchart illustrating an example of a monitoring-request transmitting process.

FIG. 13 illustrates an example of a monitoring-request transmitting process performed by the monitoring-request transmitting unit 160 of the monitoring computer 100 in accordance with the report from the monitor-data distributing unit 150.

In step 41, the monitoring-request transmitting unit 160 references the monitoring path table 110A of the storage 110 and specifies a computer 300 that is an origin of monitoring (e.g., the computer 10 in the group 1).

In step 42, the monitoring-request transmitting unit 160 transmits a monitoring request to the computer 300 that is the origin of monitoring.

In accordance with the preparation-request transmitting process, the monitor-data distributing process, and the monitoring-request transmitting process, monitoring path information, monitored-item information, and a program for monitoring another computer are distributed to all of the computers 300 belonging to a monitored object group. After the monitoring path information, the monitored-item information, and the program are distributed, a monitoring request, which reports that monitoring of another computer 300 needs to be started, is transmitted to the computer 300 within the monitored object group that is the origin of monitoring. Accordingly, when at least one of the monitoring path, the monitored item, and the program is changed, the latest monitoring path information, monitored-item information, and program will be provided to the monitored-object computers 300 in accordance with a start instruction by, for example, an administrator of the information system. As a result, monitored data is easily managed, allowing the labor done by, for example, an administrator to be decreased.

Figure 14:
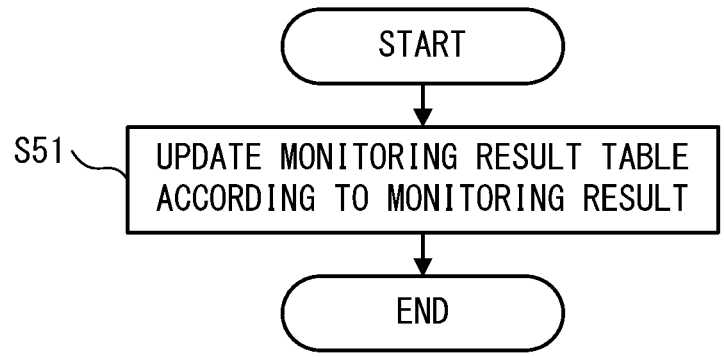
FIG. 14 is a flowchart illustrating an example of a state updating process.

FIG. 14 illustrates an example of a state updating process performed by the state updating unit 170 of the monitoring computer 100 in accordance with an arrival of a monitoring result from a computer 300 to which monitor data has been distributed. The monitoring result includes a group ID, a monitored object ID, a monitored item ID, and an operating state.

In step 51, the state updating unit 170 updates operating states in the monitoring result table 110E of the storage 110 according to the monitoring result. That is, the state updating unit 170 overwrites the operating state specified by the group ID, the monitored object ID, and the monitored item ID included in the monitoring result.

In the state updating process, the monitoring result table 110E indicates the latest state since the monitoring result table 110E is sequentially updated according to the monitoring result from the computer 300. As a result, referencing the monitoring result table 110E allows the operating state of a computer 300 belonging to a certain group to be easily recognized. Note that the monitoring computer 100 may include a function for checking the operating state of the computer 300 by referencing the monitoring result table 110E of the storage 110.

FIG. 15 illustrates an example of a responding process performed by the responding unit 320 of the computer 300 in accordance with an arrival of a preparation request from the monitoring computer 100.

In step 61, the responding unit 320 sends a response to the monitor-data distributing unit 150 of the monitoring computer 100.

In the responding process, by sending a response to the preparation request from the monitoring computer 100, the monitored-object computer 300 may report that monitoring path information, monitored-item information, and a program are prepared to be received as monitor data.

FIG. 16 illustrates an example of a monitor-data saving process performed by the monitor-data saving unit 330 of the computer 300 in accordance with an arrival of monitor data from the monitoring computer 100.

In step 71, the monitor-data saving unit 330 saves in the storage 310 monitor data, i.e., monitoring path information, monitored-item information, and a program.

In the monitor-data saving process, the monitored-object computer 300 may automatically save in the storage 310 monitor data for monitoring another computer 300.

Figure 17:
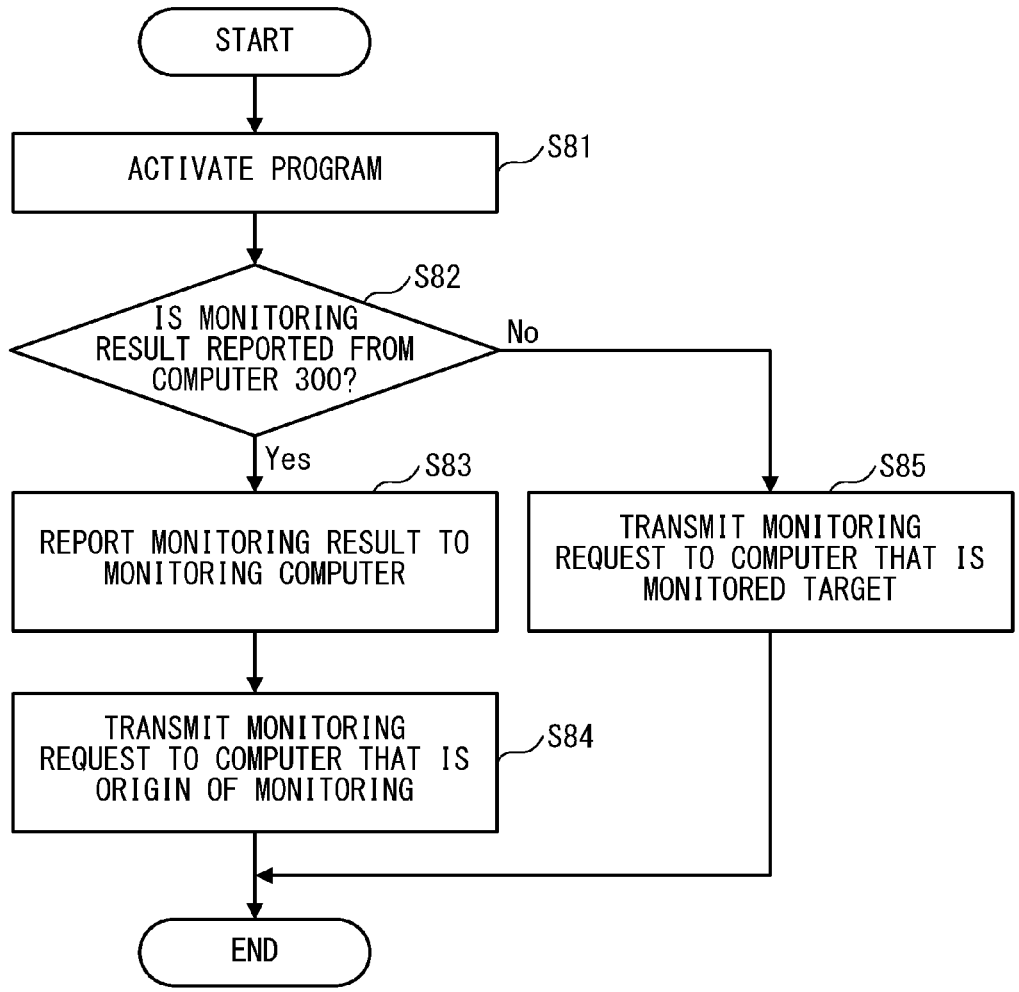
FIG. 17 is a flowchart illustrating an example of a monitoring performing process.

FIG. 17 illustrates an example of a monitoring performing process performed by the monitoring performing unit 340 of the computer 300 in accordance with a monitoring request.

In step 81, the monitoring performing unit 340 references monitored-item information in the storage 310 and activates a program for monitoring another computer 300. The activated program continues to monitor the other computer 300 until an instruction to end the monitoring is given.

In step 82, the monitoring performing unit 340 references monitoring path information in the storage 310 so as to determine whether or not the computer 300 is a reporting source that is obliged to report a monitoring result to the monitoring computer 100, i.e., determine whether or not the computer 300 is registered at the end of the monitoring path. When the monitoring performing unit 340 determines that the computer 300 is the reporting source of the monitoring result, the monitoring performing unit 340 moves the process along to step 83 (Yes), and, when the monitoring performing unit 340 determines that the computer 300 is not the reporting source of the monitoring result, the monitoring performing unit 340 moves the process along to step 85 (No).

In step 83, the monitoring performing unit 340 obtains and reports the monitoring result of the program to the monitoring computer 100. The report of the monitoring result includes a monitoring result obtained by monitoring computers 300 along the monitoring path.

In step 84, to repeat the monitoring of the computers 300 in conformity with monitoring path information, the monitoring performing unit 340 references monitoring path information in the storage 310 and transmits a monitoring request to a computer 300 that is the origin of monitoring.

In step 85, the monitoring performing unit 340 obtains a monitoring result of the program, references monitoring path information in the storage 310, and transmits the monitoring result and a monitoring request to a subsequently registered computer 300, i.e., a computer 300 that is a monitored target.

In the monitoring performing process, a monitored-object computer 300 activates the program upon arrival of a monitoring request and monitors another computer 300 in conformity with monitoring path information. The computer 300 that is obliged to report a monitoring result reports a monitoring result of the group to the monitoring computer 100 and transmits a monitoring request to the computer 300 that is the origin of monitoring. Meanwhile, the computer 300 that is not obliged to report a monitoring result transmits a monitoring result and a monitoring request to a computer 300 that is a monitored target.

Accordingly, the computers 300 that form a group cooperate with each other so that each computer 300 monitors another computer 300 in sequence in conformity with monitoring path information and so that a computer 300 that is set to report a monitoring result reports the monitoring result to the monitoring computer 100. As a result, after the monitoring computer 100 distributes monitor data to monitored-object computers 300 and transmits a monitoring request to the computer 300 that is the origin of monitoring, the monitoring computer 100 simply receives a monitoring result from the computers 300. Accordingly, even when there are many computers 300 that are monitored objects, a load on the monitoring computer 100 does not greatly increase, so that a plurality of computers 300 can be efficiently monitored. Note that, in order to monitor the computer 300 that is the origin of monitoring, a monitoring path may be set up such that another computer 300 monitors this computer 300.

Next, examples in which specific cases are considered will be described so that the present embodiment can be easily understood.

Example 1

Figures 18, 19, 20:
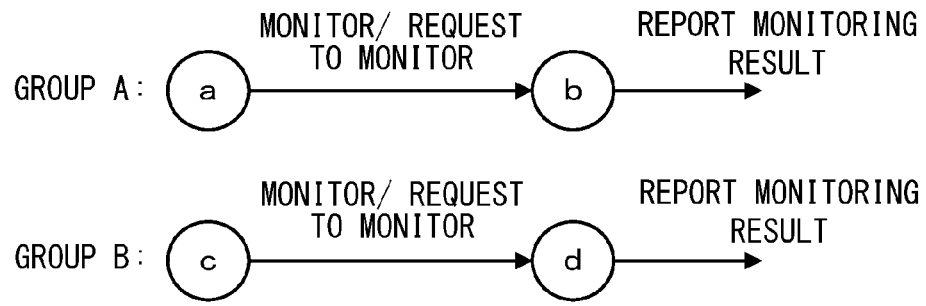
FIG. 18 is an explanatory diagram of thr first example of a computer monitoring form.
FIG. 19 is an explanatory diagram of a monitoring path table in accordance with the first example.
FIG. 20 is an explanatory diagram of a monitored item table in accordance with the first example.

In Example 1, as illustrated in FIG. 18, in group A, a computer a monitors a computer b and the computer b reports a monitoring result, and, meanwhile, in group B, a computer c monitors a computer d and the computer d reports a monitoring result.

Figures 21, 22, 23:
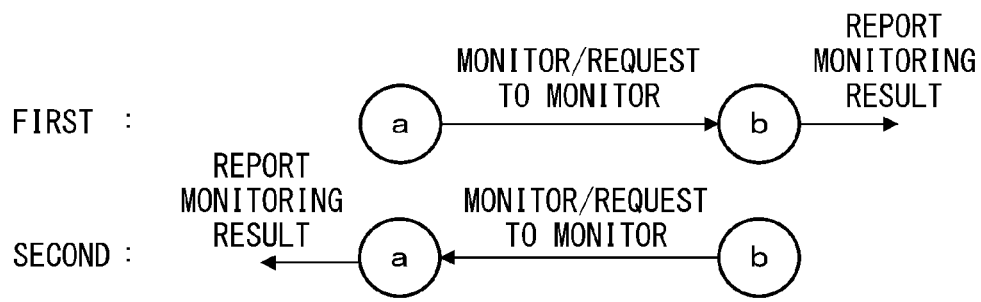
FIG. 21 is an explanatory diagram of a program table in accordance with the first example.
FIG. 22 is an explanatory diagram of a monitoring result table in accordance with the first example.
FIG. 23 is an explanatory diagram of the second example of a computer monitoring form.

In this case, a monitoring path table 110A as illustrated in FIG. 19 is stored in the storage 110 of the monitoring computer 100. As an example, in the monitoring path table 110A, a suffix "N" is added to the ends of monitored object IDs so that a computer 300 that reports a monitoring result to the monitoring computer 100 can be specified (this is also true for the following descriptions). In addition, a monitored item table 110B as illustrated in FIG. 20 and a program table 110C as illustrated in FIG. 21 are stored in the storage 110 of the monitoring computer 100. In the monitored item table 110B illustrated in FIG. 20, since there is no computer that monitors the computer a or c, "NULL", which indicates an absence of a monitored item, or another sign is set to the monitored item IDs of the computers a and c.

The computers b and d start to be monitored when the monitoring computer 100 distributes monitor data to the computers a to d and transmits a monitoring request to the computers a and d, which are origins of monitoring. After this, upon receipt of a monitoring result from the computers b and d, the monitoring computer 100 updates the operating states in the monitoring result table 110E of the storage 110 as illustrated in FIG. 22. Note that each group is not limited to including two computers but may include three or more computers.

Example 2

In Example 2, as illustrated in FIG. 23, in group A, the computer a monitors the computer b and the computer b reports a monitoring result, and then, the computer b monitors the computer a and the computer a reports a monitoring result. That is, the two computers a and b mutually monitor each other, thereby avoiding a situation in which a particular computer belonging to the group fails to be monitored.

In this case, a monitoring path table 110A as illustrated in FIG. 24 and a monitored item table 110B as illustrated in FIG. 25 are stored in the storage 110 of the monitoring computer 100. Note that the program table 110C is the same as that in Example 1.

When monitor data is distributed from the monitoring computer 100 to the computers a and b and a monitoring request is transmitted from the monitoring computer 100 to the computer a, which is the origin of monitoring, the computers a and b start to mutually monitor each other. That is, after the computer a monitors the computer b and the computer b reports a monitoring result, the computer b monitors the computer a and the computer a reports a monitoring result. After this, upon receipt of the monitoring result from the computer a or b, the monitoring computer 100 updates the operating states in the monitoring result table 110E of the storage 110 as illustrated in FIG. 26. Note that each group is not limited to including two computers but may include three or more computers.

Example 3

Figures 27, 28:
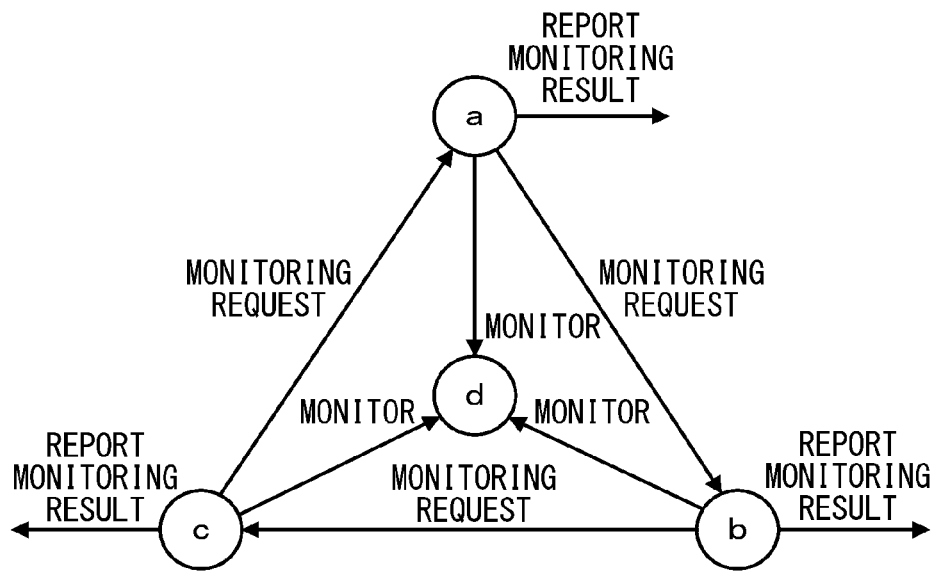
FIG. 27 is an explanatory diagram of the third example of a computer monitoring form.
FIG. 28 is an explanatory diagram of a monitoring path table in accordance with the third example.

In Example 3, as illustrated in FIG. 27, computers a to c from among a plurality of computers a to d included in group A monitor the computer d in an alternating pattern, and the computers a to c report a monitoring result in an alternating pattern. Such monitoring is needed in, for example, a situation in which system down needs to be absolutely avoided since the computer d is providing important services.

In this case, a monitoring path table 110A as illustrated in FIG. 28 and a monitored item table 110B as illustrated in FIG. 29 are stored in the storage 110 of the monitoring computer 100. Since the monitored item table 110B does not include a computer that monitors the computers a to c, "NULL", which indicates an absence of a monitored item, or another sign is set as the monitored items of the computers a to c. Note that the program table 110C is the same as that in Example 1.

When monitor data is distributed from the monitoring computer 100 to the computers a to d and a monitoring request is transmitted from the monitoring computer 100 to the computer a, which is the origin of monitoring, the computer a starts monitoring the computer d. Next, a monitoring request is transmitted from the computer a to the computer b, and the computer b starts monitoring the computer d. In this way, the computers a to c monitor the computer d in sequence and report monitoring results. Meanwhile, upon receipt of the monitoring result from the computers a to c, the monitoring computer 100 updates the operating state in the monitoring result table 110E of the storage 110 as illustrated in FIG. 30. As long as the group includes three or more computers, the number of computers that form the group is not limited to four.

Therefore, as described in [Example 1] to [Example 3], computer monitoring forms within a group may be defined by properly changing the monitoring path table 110A, the monitored item table 110B, and the program table 110C. Computer monitoring forms are not limited to those described in [Example 1] to [Example 3].

A plurality of computers may be efficiently monitored.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. A non-transitory computer-readable recording medium having stored therein a program for causing a subject computer to perform a process, the subject computer being any of a plurality of computers connected to a monitoring instruction computer that issues a monitoring instruction, the process comprising:

obtaining path information in which are registered a correspondence relationship between a monitored-target computer and a monitoring-source computer and information indicating an order in which the monitoring is executed, the correspondence relationship being determined in accordance with loads on the plurality of computers in the monitoring sequentially executed by each computer of the plurality of computers, the order being set according to the correspondence relationship, and the path information sequentially associating an ID of the monitoring-source computer that is the origin of the monitoring in sequentially monitoring according to the monitoring instruction of the monitoring instruction computer, an ID of one or more computers that are each both a monitored target and a monitoring source, and an ID of a last monitored-target computer;

obtaining monitoring result information and a first monitoring request from the monitoring-source computer that monitors the subject computer when the subject computer is registered in the path information as a computer that is both the monitored target and the monitoring source, the monitoring result information including all monitoring results for the monitoring executed by each of computers included in the path information and ranging from the monitoring-source computer that is the origin of the monitoring to the monitoring-source computer that monitors the subject computer;

monitoring the monitored-target computer to be monitored by the subject computer according to the first monitoring request and the path information;

incorporating a result of the monitoring of the monitored-target computer into the obtained monitoring result information; and transmitting, to the monitored-target computer, a second monitoring request and the monitoring result information into which the result of the monitoring of the monitored-target computer has been incorporated.

2. The non-transitory computer-readable recording medium according to claim 1, wherein when the subject computer is registered in the path information as the last monitored-target computer, the transmitting transmits, to the monitoring instruction computer, the monitoring result obtained from the monitoring-source computer that monitors the subject computer according to the path information.

3. A monitoring method performed by a subject computer that is any of a plurality of computers connected to a monitoring instruction computer that issues a monitoring instruction, the monitoring method comprising:
  obtaining path information in which are registered a correspondence relationship between a monitored-target computer and a monitoring-source computer and information indicating an order in which the monitoring is executed, the correspondence relationship being determined in accordance with loads on the plurality of computers in the monitoring sequentially executed by each computer of the plurality of computers, the order being set according to the correspondence relationship, and the path information sequentially associating an ID of the monitoring-source computer that is the origin of the monitoring in sequentially monitoring according to the monitoring instruction of the monitoring instruction computer, an ID of one or more computers that are each both a monitored target and a monitoring source, and an ID of a last monitored-target computer;
  obtaining, by using the subject computer, monitoring result information and a first monitoring request from the monitoring-source computer that monitors the subject computer when the subject computer is registered in the path information as a computer that is both the monitored target and the monitoring source, the monitoring result information including all monitoring results for the monitoring executed by each of computers included in the path information and ranging from the monitoring-source computer that is the origin of the monitoring to the monitoring-source computer that monitors the subject computer;
  monitoring the monitored-target computer to be monitored by the subject computer according to the first monitoring request and the path information;
  incorporating a result of the monitoring of the monitored-target computer into the obtained monitoring result information; and
  transmitting, by using the subject computer, to the monitored-target computer, a second monitoring request and the monitoring result information into which the result of the monitoring of the monitored-target computer has been incorporated.

4. The monitoring method according to claim 3, wherein when the subject computer is registered in the path information as the last monitored-target computer, the transmitting transmits, to the monitoring instruction computer, the monitoring result obtained from the monitoring-source computer that monitors the subject computer according to the path information.

5. A monitoring apparatus that defines as a target monitoring apparatus any of a plurality of monitoring apparatuses connected to a monitoring instruction apparatus that gives a monitoring instruction, the monitoring apparatus comprising:
  a hardware processor that performs a process including:
    obtaining path information in which are registered a correspondence relationship between a monitored-target monitoring apparatus and a monitoring-source monitoring apparatus and information indicating an order in which the monitoring is executed, the correspondence relationship being determined in accordance with loads on the plurality of monitoring apparatuses in the monitoring sequentially executed by each monitoring apparatus of the plurality of monitoring apparatuses, the order being set according to the correspondence relationship, and the path information sequentially associating an ID of a monitoring-source monitoring apparatus that is the origin of the monitoring in sequentially monitoring according to the monitoring instruction of the monitoring instruction apparatus, an ID of one or more monitoring apparatuses that are each both a monitored target and a monitoring source, and an ID of a last monitored-target monitoring apparatus;
    obtaining monitoring result information and a first monitoring request from the monitoring-source monitoring apparatus that monitors the subject monitoring apparatus when the subject monitoring apparatus is registered in the path information as a monitoring apparatus that is both the monitored target and the monitoring source, the monitoring result information including all monitoring results for the monitoring executed by each of monitoring apparatuses included in the path information and ranging from the monitoring-source monitoring apparatus that is the origin of the monitoring to the monitoring-source monitoring apparatus that monitors the subject monitoring apparatus;
    monitoring the monitored-target monitoring apparatus to be monitored by the subject monitoring apparatus according to the first monitoring request and the path information;
    incorporating a result of the monitoring of the monitored-target monitoring apparatus into the obtained monitoring result information; and
    transmitting, to the monitored-target monitoring apparatus, a second monitoring request and the monitoring result information into which the result of the monitoring of the monitored-target monitoring apparatus has been incorporated.

6. The monitoring apparatus according to claim 5, wherein when the subject monitoring apparatus is registered in the path information as the last monitored-target monitoring apparatus, the transmitting transmits, to the monitoring instruction apparatus, the monitoring result obtained from the monitoring-source monitoring apparatus that monitors the subject monitoring apparatus according to the path information.

* * * * *